Dec. 28, 1937.   E. J. GOHR   2,103,255
IMPROVED PROCESS FOR PREPARATION OF SULPHURIC DERIVATIVES
Filed Nov. 9, 1934
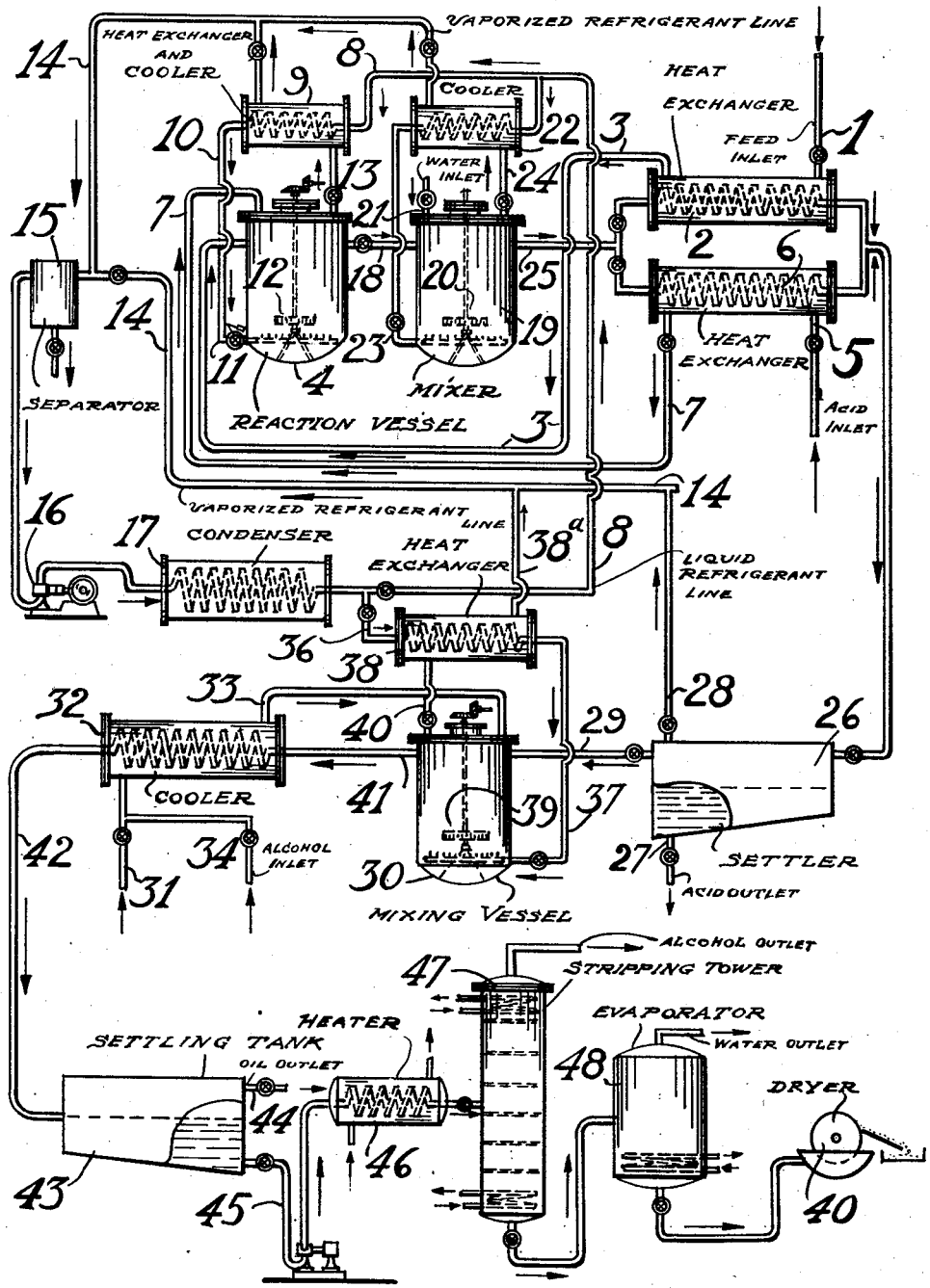
Edwin J. Gohr Inventor
By W. E. Currie Attorney Patented Dec. 28, 1937

2,103,255

UNITED STATES PATENT OFFICE 2,103,255

IMPROVED PROCESS FOR PREPARATION OF SULPHURIC DERIVATIVES

Edwin J. Gohr, Elizabeth, N. J., assignor to Standard Oil Development Company, a corporation of Delaware Application November 9, 1934, Serial No. 752,283

12 Claims. (Cl. 260—99.12)

This invention relates to an improved process for preparing sulpho derivatives of unsaturated organic compounds and, more particularly, to the preparation of valuable wetting agents and detergents by treatment of olefines of suitable molecular weight with fuming sulphuric acid at low temperatures.

Wetting agents and detergents of high quality and suitable for use in both hard and soft waters and in sea water may be prepared by treating olefines of more than about eight carbon atoms per molecule and, preferably, having the carbon atoms in a straight chain with the olefinic linkage at or near the end of the chain, with strong or fuming sulphuric acid, preferably at low temperatures at which side reactions, such as oxidation and polymerization, are inappreciable. The reaction products, consisting substantially of mono-alkyl sulphates, are neutralized with suitable bases capable of forming water soluble salts of the sulphates, and the resulting salts or soaps represent the desired product. In the preparation of such products of high quality, it is desirable to maintain a low temperature of the reaction mixture, and as short a time of contact as possible until the excess of free sulphuric acid contained therein is removed or so reduced in concentration as to be unobjectionable at room temperature. This reduction in acid strength may be accomplished by neutralization and/or dilution with water. Since both the acid-olefin reaction and the subsequent dilution and/or neutralization are exothermic processes involving the liberation of large quantities of heat, it is extremely difficult to maintain the low temperatures desired throughout the process.

It has now been found that this process can be satisfactorily conducted in the presence of added liquids which are inert to or react only slowly with the reagents involved and which are readily volatile at or near the desired maximum reaction temperature. Such liquids for the purpose of this invention and the claims may be suitably described as liquid refrigerants. These refrigerants by vaporization at the reaction temperature absorb great quantities of heat and serve automatically to maintain the temperature of the reaction mixture at the desired level. The use of these refrigerants is particularly advantageous in the preparation of wetting agents and detergents, as it has been observed that the olefin-acid reaction and the subsequent neutralization and dilution reactions are substantially instantaneous. The rate of reaction accordingly is dependent primarily upon the efficiency of mixing of the reagents and upon the ability of the equipment used to remove the evolved heat without local overheating occurring within the reaction mixture. By utilizing the high rate of the acid-olefin reaction and immediately upon its completion removing the excess of strong acid present, the undesirable side reactions proceed to a much lesser extent. High quality sulphuric derivatives can then be obtained at higher reaction temperatures, thereby permitting substantial economies in both the size of the equipment and the amount of refrigeration required.

These and further objects of this invention will be apparent from the following description and the claims.

The drawing is a diagrammatic elevation, partly in section, of one type of equipment suitable for conducting a process according to the present invention and indicates the flow of materials.

Referring to the drawing, a suitable acid reactive organic feed stock, such as a cracked fraction of a high molecular weight paraffin, containing olefins of about 10 to 20 carbon atoms per molecule, is passed by line 1 through heat exchange and cooler 2 and line 3 into reaction vessel 4. A strong sulphuric reagent, such as fuming sulphuric acid, preferably of suitable strength to be liquid at the reaction temperature desired, is passed by line 5 through heat exchanger and cooler 6 and by line 7 into the reaction vessel 4. A liquid refrigerant, such as butane, is supplied, preferably under pressure, by line 8 and is passed through heat exchanger and cooler 9 and line 10 through pressure reduction valve 11 into the reaction vessel 4. The reagents and refrigerant are brought into rapid and intimate contact in this reaction vessel by means of any suitable contacting means, such as turbo mixer 12. Opposed jets, stirrers and baffles may also be used singly or in any desired combination to effect a similar result. The reaction vessel 4 may be insulated with suitable lagging (not shown) or may be further cooled indirectly, either internally or externally, with suitable cooling coils or jackets, if desired. Ordinarily, satisfactory cooling may be obtained by the use of sufficient quantities of the liquid refrigerant. In this case the heat of reaction is absorbed in the vaporization of refrigerant and the vapors thereof are removed from the reaction vessel by line 13 and are passed through heat exchanger 9 and line 14 to a suitable recovery system which may contain a separator 15 to remove entrained material, a compressor 16 and a condenser 17 to convert the refrigerant back to the liquid state and return it to supply line 8.

After permitting sufficient time of contact and agitation to secure substantially complete admixture in reaction vessel 4, the mixture is withdrawn by line 18 and is passed immediately without appreciable rise in temperature into a second mixing vessel 19 containing suitable agitating means, such as turbo-mixer 20 or other mixing means as described in connection with reaction vessel 4. Water, preferably chilled, is supplied to this mixing vessel by line 21 and liquid refrigerant, which may be pre-cooled in heat exchanger and cooler 22, is supplied by line 23.

Sufficient water is added to dilute the excess free acid to a strength of about 40–60% (based on total free sulphuric acid and water present), with sufficiently vigorous agitation to prevent local overheating. Vaporized refrigerant is withdrawn by line 24 and may be passed through heat exchanger 22 to line 14 and the refrigerant recovery system.

The diluted reaction mixture is withdrawn through line 25 and is passed into separating means 26 which may be in the form of a settling tank, as illustrated, or which may be a centrifugal or other suitable means for separating liquids of different density. If desired, the reaction mixture may be passed through heat exchangers 2 and 6 prior to its separation and may be warmed therein to a suitable temperature, preferably not above about room temperature.

A heavy layer of dilute acid is withdrawn from the settling means 26 by line 27 and may be concentrated and reused as desired. Any refrigerant vapors may be withdrawn by line 28 and returned by line 14 to the refrigerant recovery system. The lighter or upper layer formed in the settler 26 is then subjected to any suitable treatment for the recovery therefrom of the sulphuric derivatives contained therein. This layer may be withdrawn by line 29 and passed into a third mixing vessel 30. Sufficient caustic soda or other base capable of neutralizing the reaction mixture and forming water soluble salts of the sulphuric derivatives is supplied, preferably in aqueous solution, by line 31 and may be passed through heat exchanger and cooler 32 by line 33 into mixing vessel 30. Sufficient alcohol to break the emulsion formed on neutralization may be supplied by line 34 and passed to the mixing vessel in admixture with the base used. Additional refrigerant may be supplied to mixing vessel 30 from line 8 by lines 36 and 37 and may be precooled in heat exchanger and cooler 38, if desired. This mixing vessel also contains suitable means for intimate admixture of liquids, such as turbo mixer 39. Refrigerant vapors formed by the heat evolved on neutralization may be withdrawn through line 40 and returned to the refrigerant recovery system by line 14, after passage through heat exchanger 38.

The neutral mixture is withdrawn from mixing vessel 30 by line 41 and is passed by line 42 to a second settling means which may be a settling tank 43, as illustrated, or other suitable means for separating liquids of different densities, such as a centrifuge. If desired, this mixture may be passed through heat exchanger 32, or other heater, prior to the separation in order to vaporize any remaining refrigerant, which may be removed prior to the separation of the liquid phases. However, many refrigerants, such as the liquefied gaseous hydrocarbons, aid the latter separation due to their low density and relative solvent action for unreacted oil, and are preferably permitted to remain in the mixture. If it is desired to conduct the separation at a higher temperature than the boiling point of the refrigerant, the separation may be conducted under pressure.

The neutralized mixture separates in vessel 43 into a heavier aqueous layer containing inorganic salts and substantially all the salts of the sulphuric derivatives formed and a lighter layer consisting substantially of unreacted oily components of the feed stock and any residual refrigerant. This upper layer of oil and refrigerant, which may be partly gasified, may be withdrawn by line 44, and the refrigerant may be separated therefrom and returned to the refrigerant recovery system in any suitable manner. The oil, which has been substantially refined by this treatment, may be used for the production of refined kerosene, lubricating oil, medicinal oils and the like, depending upon the nature of the feed stock used.

The aqueous alcohol layer is withdrawn by line 45 and may be freed of alcohol and water by any desired means, such as by passage through heater 46, distillation and fractionation tower 47 to remove alcohol and evaporator 48 to remove most of the water. The concentrated aqueous solution may then be reduced to dryness by any suitable drying means, such as drum dryer 49, as illustrated, or by a spray dryer or by further evaporation, which may be under vacuum.

While the drawing and the above description indicate the use of various heat exchangers throughout the process, it is to be understood that these are used largely for purposes of heat economy, and may be eliminated and the entire cooling done by means of the liquid refrigerant, if desired. It is preferred, however, to precool the reagents for the acid-olefin reaction approximately to the reaction temperature. This may be accomplished by preliminary contact of either reagent with the liquid refrigerant and partial evaporation thereof. Either or both reagents may be supplied to the reaction zone in admixture with liquid refrigerant. In this case the mixing and reaction may be accomplished by passing the streams, preferably under high velocity, through an elongated reaction zone in which baffles, which may be stationary or mechanically operated to aid mixing, are situated, suitable precation being taken to permit evolution of refrigerant vapors and to prevent undue rise in temperature or pressure. Similar methods of operation and procedure may also be used in the subsequent dilution and/or neutralization steps. If desired, as in treating a substantially pure olefine feed stock, the dilution and acid separation steps may be eliminated and the entire reaction mixture may be directly neutralized.

It will be understood from the above that the described process and apparatus are merely illustrative and that this invention is not to be limited thereto, as many variations in both will be apparent to the expert.

The maximum reaction temperature depends upon the nature of the unsaturated compounds used and also upon the strength of the sulphuric acid and the time of contact before dilution or neutralization of the excess acid. The use of liquid refrigerants, particularly such as are solvents for one of the reagents, may permit somewhat higher reaction temperatures than may be used with indirect cooling without reduction in quality of the sulphuric derivatives obtained. In treating olefines of more than 8 or 10 carbon atoms, obtained by cracking paraffin wax or petrolatum by destructive distillation at pressures below about 50 pounds per square inch, the reaction is preferably conducted at temperatures below about 40° F. However, if the time of contact is very short, below about 2 to 4 minutes, reaction temperatures as high as 60 to 70° F. or somewhat higher may be used. In treating cracked oils, crude oils and olefines less stable than those obtained by cracking wax, the maximum temperatures are preferably 10 to 15° F. lower than those given above, for the best results. Higher temperatures may of course be used, but usually the products will be inferior in both color and wetting and detergent properties.

Suitable refrigerants are the paraffins of about 2 to 6 carbon atoms and mixtures thereof. Paraffins of 3 to 5 carbon atoms, namely propane, butane and pentane, are usually preferred. The refrigerant chosen should be largely vaporizable at the maximum reaction temperature desired. The reaction temperature may also be controlled by conducting the reaction under a controlled pressure or vacuum which is so adjusted to permit vaporization of the refrigerant at the desired temperature.

While fuming sulphuric acid is the preferred acid, other strong sulphuric reagents, such as concentrated sulphuric acid may also be used. The fuming acid may be of any desired strength, but is preferably liquid at the reaction temperature. Fuming acid containing about 5 to 25% sulphuric anhydride is preferred for reaction conducted below about 32° F., but acid containing either less or more sulphuric anhydride may also be used; for example, acid containing 65% sulphuric anhydride. It is desirable to conduct the reaction so as to maintain continuously an excess of sulphuric acid over the olefine present, so as to avoid the formation of unstable dialkylsulphates. This is disclosed more fully and claimed in copending application Ser. No. 752,312 filed November 9, 1934, by Fulton and Vesterdal. For example, a stream of a cracked wax fraction may be brought into contact with a stream of fuming sulphuric acid containing about 1.1 to 1.5 mols of sulphuric acid (not including the sulphuric anhydride) per mol. of olefine in the process described above in connection with the drawing.

When the organic reagents used are fairly free of color and odor the resulting sulphuric derivatives are ordinarily of sufficient purity for immediate use without further refining. However, when dirty or odorous stocks are used, or reaction temperatures are permitted to run too high, inferior products may result, and may be purified by solvent extraction, filtration, contact with active clays or carbon, and treatment with peroxide or other bleaching and refining agents as in ordinary soap refining practice. It is generally preferable, in using such stock, to purify the oil before the acid reaction. This may be done according to ordinary oil refining practice. Asphaltic and tarry or pitchy bodies may be removed by clay filtration or a preliminary treatment with a small amount of sulphuric acid, which may also be used to remove any water present. The oils may also be deasphaltized and dewaxed with selective solvents. For example, the liquid refrigerants used in the acid reaction may be mixed with the oil and the mixture subjected to such conditions of pressure and temperature as to cause precipitation of, first, any asphalt contained therein, and second, any wax. The asphalt and wax may also be precipitated and removed together, as by the addition of propane and cooling, which may be obtained by vaporization of some of the propane. The purified and chilled mixture may then be subjected directly to contact with a strong sulphuric reagent, thereby permitting economies in refrigeration. Such a combination of dewaxing and contact with acid in the same liquid refrigerant is particularly desirable in treating cracked wax fractions, which usually contain substantial quantities of distilled, uncracked wax.

The use of cracked paraffins of high molecular weight for the preparation of improved wetting agents and detergents, is described in co-pending application, Serial No. 704,749, filed December 30, 1933, by William J. Sweeney. This process may also be applied to the preparation of wetting agents and detergents from cracked hydrocarbons generally, as described in co-pending application, Serial No. 752,286, filed November 9, 1934, by Per K. Frolich, and wetting agents may similarly be prepared with crude petroleum oils and fractions thereof obtained by distillation or extraction as described in co-pending application, Serial No. 752,313, filed November 9, 1934, by Raphael Rosen. The process may also be used for the preparation of sulphuric derivatives of substantially all unsaturated organic compounds containing an olefinic linkage and of suitable molecular weight and structure for the preparation of detergents and wetting agents. For example, unsaturated alcohols and acids, such as oleyl alcohol and oleyl acid and esters containing an unsaturated alcohol or acid radical may also be used.

This invention is not to be limited to any illustrative example, or theoretical explanation, which has been presented herein solely for purpose of illustration, but is limited only by the following claims, in which it is desired to claim all novelty insofar as the prior art permits.

I claim:

1. In the preparation of organic derivatives of sulphuric acid by treatment of an olefine with excess strong sulphuric acid at a low temperature and the subsequent reduction in the strength of the excess sulphuric acid sufficient to prevent further action of said excess acid in said reaction mixture by means involving liberation of heat, an improved method of operation comprising conducting both of said steps in the presence of an added liquid refrigerant sufficient in quantity to remove the heat evolved in both the acid reaction and the acid strength reducing step which removes heat from the reaction mixture by vaporization.

2. In the preparation of improved detergents by the treatment of olefines of more than 10 carbon atoms with fuming sulphuric acid at a temperature below about 70° F. and the subsequent reduction in strength of sulphuric acid in said reaction mixture to below about 60% while maintaining the temperature of said mixture continuously below about 70° F., an improved method of operation comprising conducting both of said steps in the presence of a liquid refrigerant which removes heat from the reaction mixture by vaporization.

3. Process according to claim 2 in which said refrigerant is a normally gaseous hydrocarbon.

4. Process according to claim 2 in which said refrigerant is a paraffin of 2 to 6 carbon atoms.

5. Process according to claim 2 in which said olefine comprises a mixture of olefines obtained by cracking a paraffinic material of the class of paraffin wax and petrolatum.

6. Process according to claim 2 in which said reduction in acid strength is accomplished by addition of water to the reaction mixture.

7. Process according to claim 2 in which said reduction in acid strength is accomplished by neutralization with a suitable base capable of forming water soluble detergents with the sulphuric derivatives of said olefines.

8. Process according to claim 2 in which the temperature in both steps is maintained below about 40° F.

9. Process for preparing improved detergents and wetting agents comprising bringing an excess of fuming sulphuric acid into contact, with vigorous agitation, with an olefine-containing fraction of a cracked paraffin wax of more than about 8 carbon atoms per molecule in the presence of a liquid paraffin of 3 to 5 carbon atoms at a reaction temperature below about 70° F., adding water to the reaction mixture to reduce the strength of residual sulphuric acid to about 40 to 60% while maintaining the temperature of said mixture continuously below about 70° F., maintaining said temperatures in both steps at least partly by vaporization of said refrigerant, separating the resulting sulphuric derivatives of olefines from the diluted mixture and neutralizing said derivatives with a suitable base to form a detergent.

10. Process according to claim 9 in which both steps are conducted in less than about 4 minutes.

11. Process according to claim 9 in which said diluted acid is separately withdrawn and in which the resulting mixture containing refrigerant is neutralized with said base.

12. Process according to claim 9 in which said cracked wax fraction is mixed with said liquid refrigerant and is chilled to said reaction temperature and any wax thereupon precipitating is removed prior to contact of said mixture with fuming sulphuric acid.

EDWIN J. GOHR.